Nov. 28, 1967      B. A. RASMUSSEN      3,355,194

LOCKING DEVICE FOR TELESCOPIC TUBES

Filed June 2, 1965

INVENTOR
Benny Allan Rasmussen

BY *Otto John Munz*

ATTORNEY

United States Patent Office 3,355,194
Patented Nov. 28, 1967

3,355,194
LOCKING DEVICE FOR TELESCOPIC TUBES
Benny Allan Rasmussen, Copenhagen, Denmark, assignor to Jomi Industri A/S, Copenhagen, Denmark
Filed June 2, 1965, Ser. No. 460,810
3 Claims. (Cl. 285—302)

This invention relates to a locking device for telescoping tubes. In particular, this invention relates to a locking device for telescoping tubes comprising a wedge member adapted to clamp the end of an inner tube into the end of the outer tube in the expanded position of the tubes.

When telescoped tubes are expanded by pulling them from each other, the inner tubes may be moved with a relatively high velocity in relation to the outer tube, so that wedge-type clamping members are clamped under a heavy impact similar to a hammer blow. The tube ends are thus rigidly coupled to each other in the expanded position of the tubes. However, when the tubes are to be retelescoped by sliding them together, a dynamic or stroke-like effect cannot be obtained, and it is therefore often very difficult to slide the tubes together by exerting a simple manual pressure in the longitudinal direction of the tubes. It has sometimes been found necessary to use a hammer or other such impacting device to loosen the wedge coupling to enable the tubes to be pushed together.

In one previous device, a central axial rod was connected to the wedge member in order to eliminate this difficulty. The rod could be slid axially by operation of a lever passing through a hole in the wall of the outer tube. However, this structure was complex, and the protruding lever was found to be undesirable and awkward. In some instances, a protruding lever could not be employed.

It is an object of this invention to provide a locking device for telescoping tubes which is simply assembled and which is reliable and durable.

It is another object of this invention to provide a locking device for telescoping tubes which permits easy telescoping of the tubes from the expanded position.

It is still another object of this invention to provide a locking device for telescoping tubes wherein the wedge clamp maintaining the tubes in the expanded position can be easily loosened without the use of projecting levers or the like.

It is yet another object of this invention to provide a locking device for telescoping tubes comprising an inner tube and an outer tube concentric therewith, and a wedge means surrounding the end of the inner tube for clamping the end of the inner tube into the end of the outer tube when said tubes are in the expanded position. The wedge means has a projection extending inward into the path of the next following smaller tube, whereby the projection is struck by the end of the next smaller tube and the wedge is loosened when the next smaller tube is telescoped within the inner tube.

These and other objects and purposes of this invention will be understood by those acquainted with the design and construction of locking devices for telescoping tubes upon reading the following specification and the accompanying drawings.

Figure 1:
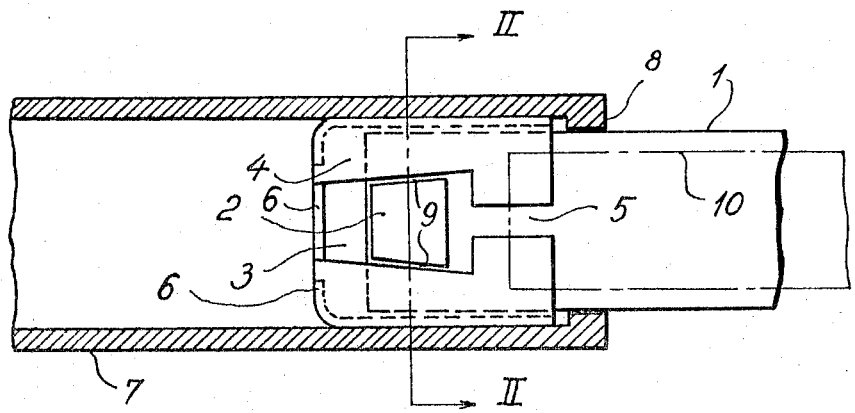
FIGURE 1 is a longitudinal section through the joint of an outer and an inner tube in the expanded position showing details of the locking device.
Figure 2:
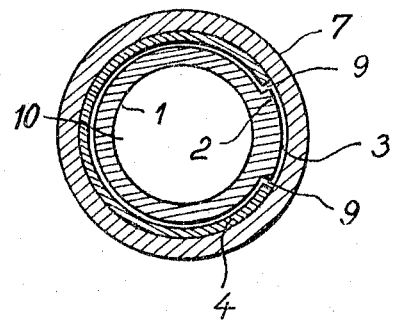
FIGURE 2 is a cross-sectional view of the locking device taken along line II—II in FIGURE 1.

Referring to FIG. 1, the outside of the inner tube 1 is provided with a wedge-shaped cam projection 2 near the free end of the tube. The end of the inner tube 1 is surrounded by a cylindrical bushing 4 having a wedge-shaped slot 3 into which the wedge-shaped cam 2 projects. The end of the bushing 4 which projects beyond the end of the inner tube 1 has a projection 6 extending inward in the form of an inwardly directed flange. The projection 6 extends into the clear opening radially inward of the inner surface of the inner tube 1.

The bushing 4 fits accurately within the inner wall of the outer tube 7. The outer tube 7 has a thickened flange portion 8 extending inwardly which prevents the bushing 4 from being pulled out of the outer tube 7. The wedge-shaped slot 3 in the cylindrical bushing 4 has a narrower extension 5 which is narrower than the wedge-shaped projection 2. Therefore, when the inner and outer tubes are pulled apart, the cylindrical bushing is pulled against the flange portion 8, abutting the same.

The cam 2 has two key flats or engaging surfaces 9 which converge toward the free end of the inner tube 1. The side walls or engaging surfaces of the wedge-shaped slot 3 also converge toward the free end of the inner tube 1, preferably at an angle parallel to the respective engaging surfaces 9. When the inner tube 1 is pulled out of the outer tube 7, the bushing is pulled into contact with the flange 8, preventing further expansion of the tubes. Movement of the inner tube 1 back into the outer tube 7 pushes the wedge-shaped projection or cam 2 into engaging contact with the wedge-shaped side walls of the slot 3, pushing the outer surface of the bushing 4 into clamping contact with the inner surface of the outer tube 7, due to expansion of the bushing 4. As a result, the end of the inner tube 1 is clamped to the end of the outer tube 7 in a rigid relationship.

In the device of this invention, the wedge clamp is released when the tubes are again telescoped or pushed together. The release of the clamp is effected by sliding a further smaller tube 10 in the inner tube 1. The tube 10 will strike the projection 6 extending inwardly from the bushing 4, and thus release the bushing 4 from the cam 2. When a plurality of concentric tubes are employed which are mutually slidable, the inner tube will effect the release of the clamping joint between the outer tube and the tube surrounding the outer tube by the same impact effect. In this way, all of the clamp joints will be released with the exception of the clamp joint between the innermost tube and the tube immediately surrounding the innermost tube. The latter clamping joint can be released by the use of a rod or auxiliary tube. Alternatively, another type locking device can be employed between the latter tubes such as a leaf spring of the type employed in umbrellas.

In the device of this invention, the wedge clamping between ends of adjacent tubes is obtained by the use of a wedge member having at least one projection extending beyond the inner surface of the inner tube and into the path of a next following smaller tube. The projection is struck when the smaller tube is slid in the interior of the inner tube into contact with the projection.

In the device of this invention, a further tube is slidable in the interior of the inner tube, and this further tube can be slid with a great force through the inner tube until it hits said projection. Thereby, the wedge member received a rapid blow which is capable of loosening it. If no further tube is present in the interior of the inner tube, i.e., if the latter is the last tube in a series of tubes to be pushed together, a rod or auxiliary tube for releasing the wedge member as described above can be provided in the innermost tube. In a locking device of this type for telescoping tubes, it will always be possible to obtain a hammer-stroke effect capable of releasing the wedge connections prior to pushing the tubes together. This result is obtained with the device of this invention with a simply constructed arrangement of elements which require no parts protruding from the side walls of the tubes or tube.

Obviously, many modifications and variations of the invention as described hereinabove can be made without departing from the essence and scope thereof, and only such limitations should be applied as are indicated in the claims.

The invention claimed is:

1. A locking device for telescoping tubes comprising an inner tube, an outer tube concentric therewith, and a cylindrical, expandable bushing surrounding an end of the inner tube and frictionally engaging the inner surface of the outer tube, said bushing having a longitudinally extending slot means extending through at least one end thereof with a wedge-shaped portion converging toward said end of the inner tube, said inner tube having a wedge-shaped projection means complementary to said wedge-shaped slot and having a circumferential extent greater than the minimum circumferential extent of said slot for engaging said wedge-shaped portion and expanding said bushing against said outer tube thereby frictionally locking said tubes against longitudinal movement, and, said outer tube having an inwardly extending flange portion means having a diameter less than the diameter of said bushing, said slot means at the end of said bushing toward the inwardly extending flange portion of said outer tube being narrower than said wedge-shaped projection, whereby the wedge-shaped projection pulls said bushing against said inwardly extending flange portion when said tubes are longitudinally extended.

2. The locking device of claim 1 wherein the end of the bushing toward which the wedge shaped slot converges has an inwardly extending projection means for contact with a next smaller tube, whereby said wedge-shaped projection is disengaged from said wedge-shaped portion of the bushing when said next smaller tube is telescoped within said inner tube.

3. The locking device of claim 2 wherein the slot means extends along the full longitudinal length of the bushing.

References Cited

UNITED STATES PATENTS

| | | | |
|---|---|---|---|
| 2,555,515 | 6/1951 | Slater | 287—58 |
| 2,643,143 | 6/1953 | Bergqvist | 287—58 |
| 2,658,777 | 11/1953 | Rauglas | 287—58 |

FOREIGN PATENTS

| | | |
|---|---|---|
| 105,762 | 7/1924 | Switzerland. |

EDWARD C. ALLEN, *Primary Examiner.*

CARL W. TOMLIN, *Examiner.*

D. W. AROLA, *Assistant Examiner.*